United States Patent
Youn

(10) Patent No.: US 6,716,058 B2
(45) Date of Patent: Apr. 6, 2004

(54) CRADLE DEVICE OF PORTABLE TERMINAL

(75) Inventor: Jae-Sam Youn, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/198,135

(22) Filed: Jul. 19, 2002

(65) Prior Publication Data

US 2003/0040216 A1 Feb. 27, 2003

(30) Foreign Application Priority Data

Aug. 21, 2001 (KR) .................................... 2001-50469

(51) Int. Cl.⁷ .......................................... H01R 13/60
(52) U.S. Cl. ................... 439/535; 439/534; 439/929; 439/31; 439/165; 439/446
(58) Field of Search ............... 439/535, 534, 439/929, 31, 165, 446

(56) References Cited

U.S. PATENT DOCUMENTS

| | | | | |
|---|---|---|---|---|
| 5,238,421 A | * | 8/1993 | Kobayashi | 439/165 |
| 5,888,087 A | * | 3/1999 | Hanson et al. | 439/374 |
| 6,113,409 A | * | 9/2000 | Park | 439/310 |
| 6,193,546 B1 | * | 2/2001 | Sadler | 439/534 |

* cited by examiner

*Primary Examiner*—Truc Nguyen
(74) *Attorney, Agent, or Firm*—Staas & Halset LLP

(57) ABSTRACT

A cradle device of a portable terminal such as a PDA (personal digital assistance). The cradle device of the portable terminal has a cradle body on which the portable terminal is placed; and a holder to embrace the portable terminal settled on the cradle body. The holder is rotatable with respect to the cradle body within a predetermined angular range. A bracket hinge is settled at the cradle body, and a bracket shaft is settled at the holder. A friction member is disposed between the bracket hinge and the bracket shaft with a predetermined friction force. Accordingly, an angle of the holder can be freely adjusted when the portable terminal is embraced by the holder.

7 Claims, 4 Drawing Sheets

CRADLE DEVICE OF PORTABLE TERMINAL

CROSS-REFERENCE TO RELATED APPLICATIONS

This application claims the benefit of Korean Application No. 01-50469, filed Aug. 21, 2001, in the Korean Industrial Property Office, the disclosure of which is incorporated herein by reference.

BACKGROUND OF THE INVENTION

1. Field of the Invention

The present invention relates to a cradle device of a portable terminal, and more particularly to a cradle device to put away and store a portable terminal or to supply external electrical power to the portable terminal.

2. Description of the Related Art

Generally, a cradle device is used to supply an external electrical power to a power supply unit in a portable terminal such as a PDA (personal digital assistance), or to put away and store the portable terminal that is not used. Recently, the portable terminal has been becoming more broadly used, since the portable terminal can allow a user to overcome the limit of the range of transmission and reception due to the increasing development of electrical communication. Accordingly, the cradle device of the portable terminal also needs an improved function. However, when the portable terminal is used in operations such as a computer or communication as the portable terminal is settled on the cradle device, there is inconvenience to the user because the portable terminal is used while settled on the cradle device with only a certain limiting angle.

In other words, as illustrated in FIG. 1, the user charges a portable terminal 80, or uses the portable terminal 80 by settling the portable terminal 80 on a cradle device 10 to supply the portable terminal 80 with electrical power. In the conventional cradle device 10 of the portable terminal 80, there is only a device to settle the portable terminal 80. Also, the conventional cradle device 10 has a simple structure to be connected with the external electrical power to supply the electrical power to the portable terminal 80.

When the portable terminal 80 is settled on the cradle device 10 having the above structure, the user experiences inconvenience in using the portable terminal 80, since the user can use the portable terminal 80 at only a fixed angle due to the cradle device 10. In other words, although the angle of a screen of the portable terminal 80 needs to be adjusted for such working conditions as light or a position of the user, the conventional cradle device 10 cannot adjust the angle of the screen of the portable terminal 80. Therefore, there is a problem that the user has to use the portable terminal 80 at a fixed angle of the screen.

SUMMARY OF THE INVENTION

Accordingly, it is the object of the present invention to provide a cradle device of a portable terminal allowing a user to adjust an angle of the portable terminal freely so that the user can see the screen of the potable terminal comfortably.

Additional objects and advantages of the invention will be set forth in part in the description which follows and, in part, will be obvious from the description, or may be learned by practice of the invention.

The foregoing and other objects of the present invention are achieved by providing a cradle body on which the portable terminal is placed; and a holder to embrace the portable terminal settled on the cradle body. The holder being rotatable with respect to the cradle body within a predetermined angular range.

The cradle device further comprises: a settling unit to settle the holder to the cradle body so that a rotation of the holder with respect to the cradle body is prevented. Here, the settling unit comprises: a first settling member settled at the cradle body; a second settling member settled at the holder and connected with the first settling member to provide a relative rotation thereto; and a friction member disposed between the first settling member and the second settling member, the friction member being contacted with the first settling member and the second settling member to provide a predetermined frictional force. Therefore, the user can adjust the rotation angle of the portable terminal embraced by the holder at any angle that the user desires.

BRIEF DESCRIPTION OF THE DRAWINGS

These and other objects and advantages of the invention will become apparent and more readily appreciated from the following description of the embodiments, taken in conjunction with the accompanying drawings of which.

DESCRIPTION OF THE PREFERRED EMBODIMENT

Figure 1:
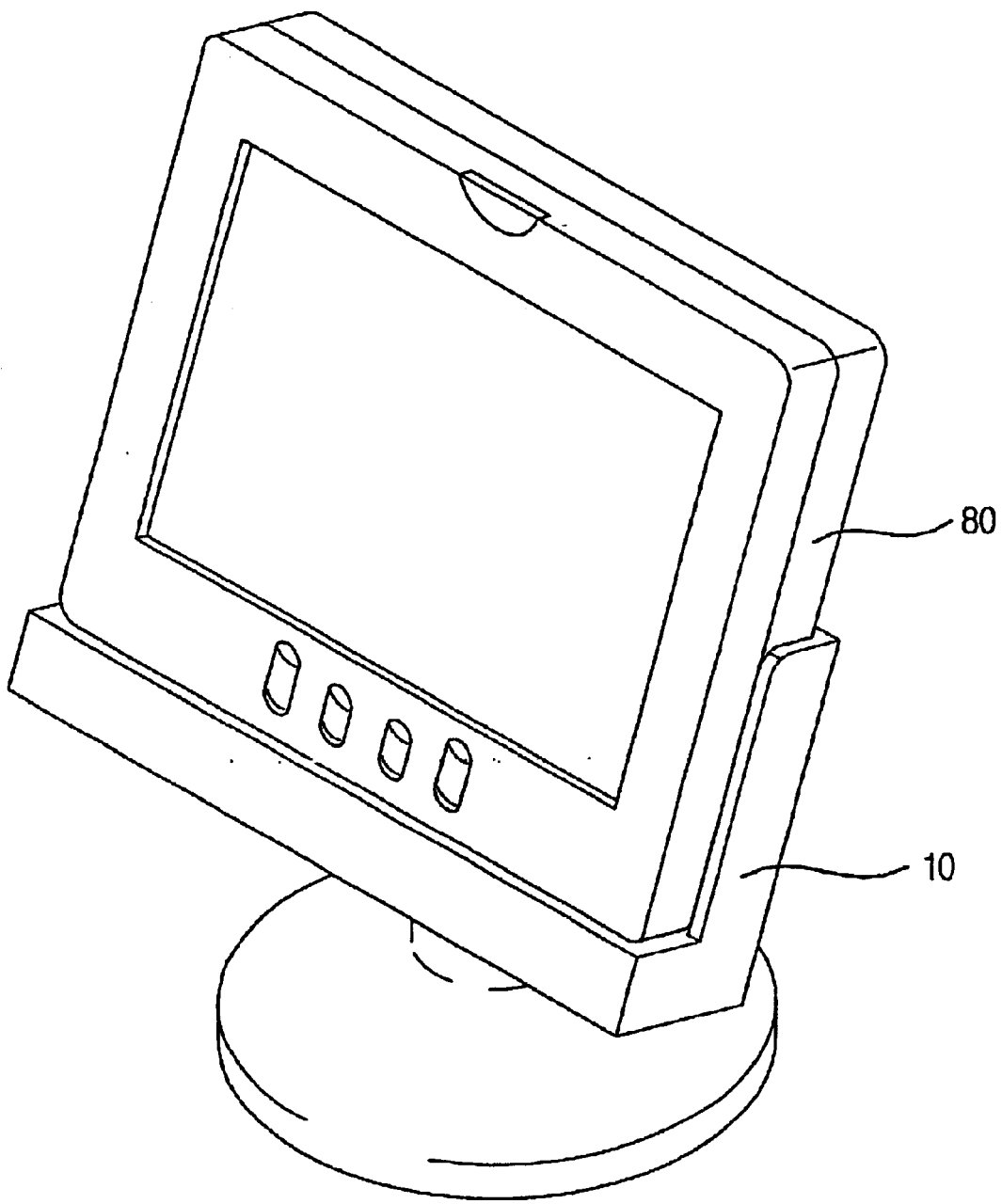
FIG. 1 illustrates a conventional cradle device embracing a portable terminal.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 2:
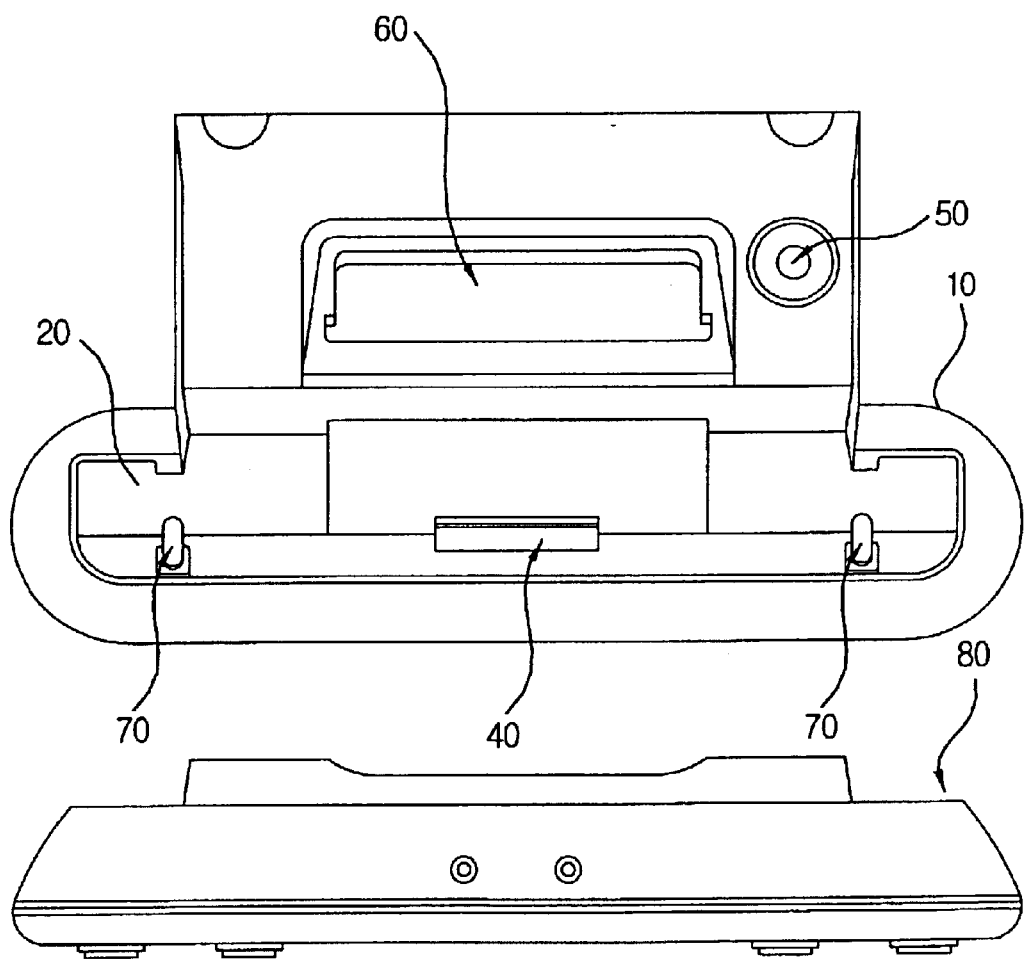
FIG. 2 is a plan view illustrating a cradle device according to an embodiment of the present invention.
Figure 3:
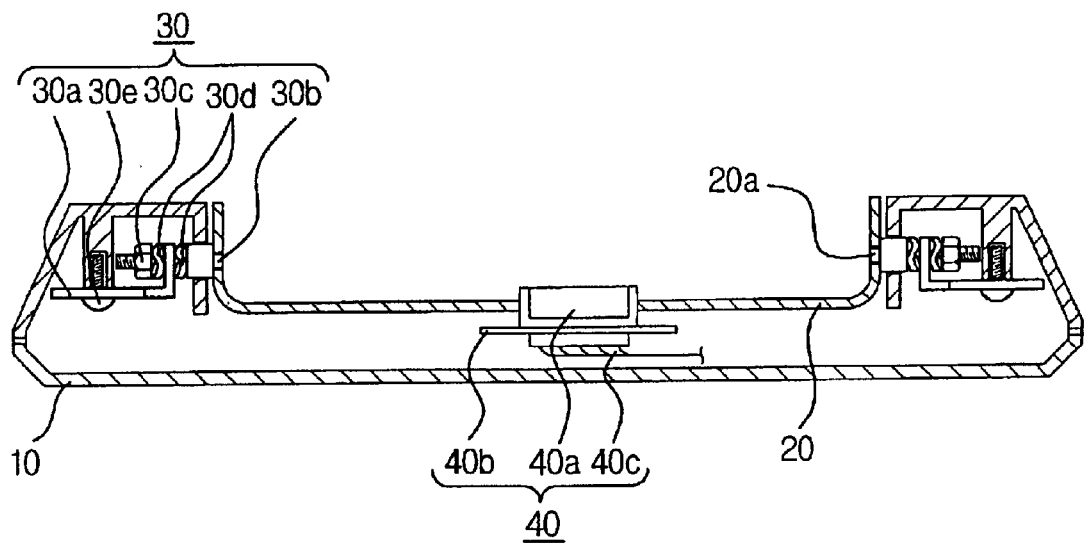
FIG. 3 is a front view of the cradle device of FIG. 2.
Figure 4:
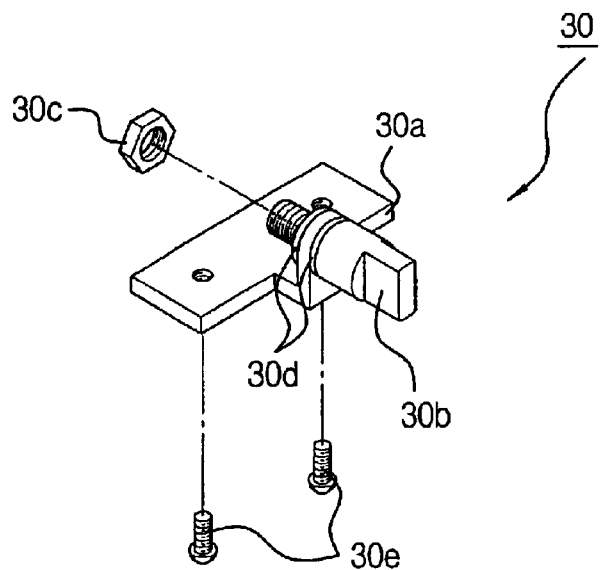
FIG. 4 is an exploded perspective view of a settlement unit of FIG. 3.

Hereinbelow, a cradle device of a portable terminal according to the an embodiment of the present invention will be described in great detail by referring to FIGS. 2 through 4.

The cradle device comprises a cradle body 10, a holder 20 and a settlement unit 30. The cradle body 10 has a charge unit 60 to charge an electrical power to a power supply unit built-in a portable terminal 80, and a pen hole 50 to receive a pen, which is an input device of the portable terminal 80.

The holder 20 has a power supply unit 40 to supply an external electric power to the portable terminal 80, and a guide 70 to settle and provide ground contact to the portable terminal 80. The power supply unit 40 includes a power supply terminal 40a to supply the electrical power to the power supply unit in the portable terminal 80, a PCB (printed circuit board) connection member 40b connected with a PCB of the cradle body 10, and a cable 40c connected with the PCB connection member 40b. Here, the holder 20 is formed as a groove type holder to embrace a lower part of the portable terminal 80.

The settling unit 30 comprises a bracket hinge 30a and a bracket shaft 30b. The bracket hinge 30a and the bracket shaft 30b are rotatably connected to each other. In other words, the bracket shaft 30b penetrates the bracket hinge 30a, and a nut 30c is connected with one end of the penetrating bracket shaft 30b. At this end, a threaded portion of the bracket shaft 30b is connected with the nut 30c.

The bracket hinge 30a is settled at the cradle body 10 by a pair of bolts 30e. The bracket shaft 30b is inserted into the holder 20 without using any separate elements to settle the settlement unit 30. In other words, a hole 20a is connected with the bracket shaft 30b by being engaged therewith without using any other elements formed at the holder 20. In addition, the bracket shaft 30b is inserted into the hole 20a and relatively rotated with respect to the bracket hinge 30a. At this time, a friction member 30d is disposed between the bracket hinge 30a and the bracket shaft 30b by a predetermined frictional force. Accordingly, the bracket hinge 30a and the bracket shaft 30b have a predetermined frictional force enough to settle the holder 20 while maintaining a set-up angle by the friction member 30d, when a user adjusts the portable terminal 80 by rotating the portable terminal 80 settled on the holder 20 with respect to a predetermined angle. In this embodiment of the present invention, the bracket hinge 30a and the bracket shaft 30b of the settling unit 30 rotate the holder 20 by the frictional force. Yet, alternative operations that provide the same results may be used to realize the present invention. For example, a plurality of locking members can be provided to adjust the angle at different increments.

Figure 5:
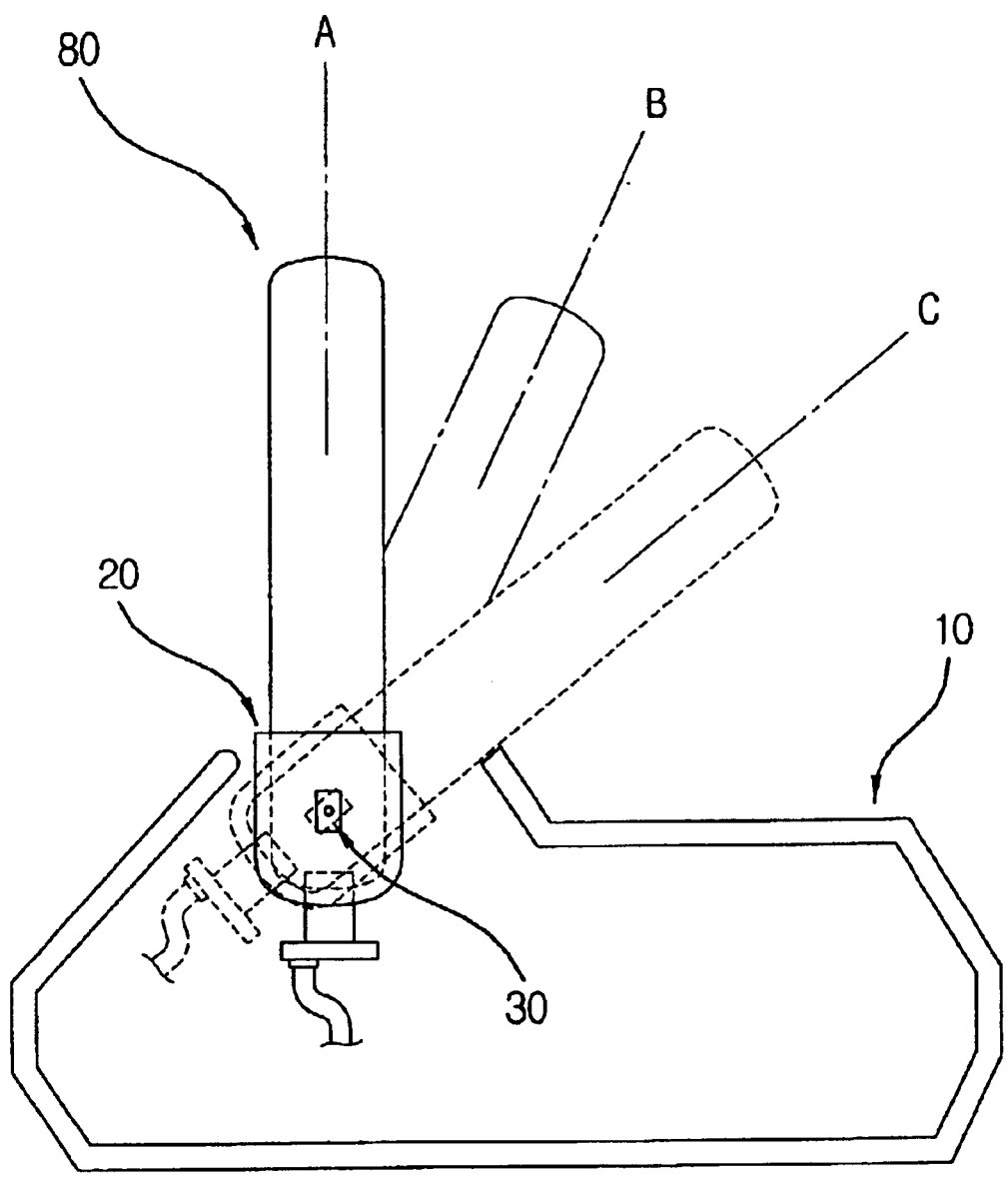
FIG. 5 is a side view illustrating the range of the angle adjustment of the cradle of FIG. 2.

Hereinbelow, the angle adjustment operation of the portable terminal 80 settled on the cradle device will be described while referring to FIG. 5. The angle of the holder 20 embracing the portable terminal 80 is adjusted by the user. Here, the range of the angle adjustment of the portable terminal 80 is adjustable within a range of the rotation of the holder 20. In other words, the user can adjust the angle of the portable terminal 80 from line 'A' to line 'C'.

According to the cradle device of the portable terminal 80, the holder 20 can relatively rotate with respect to the cradle body 10 by the frictional force of the settlement unit 30, thus the angle of the holder 20 can be adjusted. Therefore, the angle of the portable terminal 80 settled on the holder 20 also can be adjusted.

According to the present invention, when the portable terminal 80 is used while being settled on the cradle device, the angle of the screen of the portable terminal 80 can be freely adjusted with respect to the present working condition such as the light, and the position of the user.

Although a few embodiments of the present invention have been shown and described, it will be appreciated by those skilled in the art that changes may be made in these embodiments without departing from the principles and spirit of the invention, the scope of which is defined in the claims and the equivalents.

What is claimed is:

1. A cradle device of a portable terminal, comprising:
   a cradle body on which the portable terminal is settled, the cradle body having a first end and a second end;
   a holder to embrace the portable terminal settled on the cradle body, the holder being rotatable with respect to the cradle body within a predetermined angular range and having a first end and a second end; and
   first and second settling units to settle the holder to the cradle body, the first settling unit connecting the first end of the cradle body to the first end at the holder and the second settling unit connecting the second end of the cradle body to the second end of the holder,
   wherein each settling unit has a bracket hinge connected to one of the cradle body and the holder, a bracket shaft connected to the remaining one of the cradle body and the holder, and also movably connected to the bracket hinge, and a friction member, disposed between the bracket hinge and the bracket shaft, and providing a friction force to maintain position of the movable holder after rotation thereof by a user.

2. The cradle device according to claim 1, wherein the holder has a power supply terminal to supply an external electrical power to the portable terminal embraced by the holder.

3. A cradle device of a portable terminal, comprising:
   a cradle body on which the portable terminal is settled, the cradle body having a first end and a second end;
   a holder to embrace the portable terminal settled on the cradle body, the holder being rotatable with respect to the cradle body within a predetermined angular range and having a first end and a second end; and
   first and second settling units to settle the holder to the cradle body, the first settling unit connecting the first end of the cradle body to the first end of the holder and the second settling unit connecting the second end of the cradle body to the second end of the holder,
   wherein the settling units each comprise
      a bracket hinge settled at one of the ends of the cradle body;
      a bracket shaft settled at one of the ends of the holder and connected with a respective bracket hinge to provide a relative rotation thereto; and
      a friction member disposed between the bracket hinge and the bracket shaft, the friction member being in contact with the bracket hinge and the bracket shaft to provide a friction force so as to maintain a position of the holder after rotation by a user.

4. A cradle device to support a portable terminal, comprising:
   a cradle body having first and second ends;
   a movable holder having first and second ends to support the portable terminal, the first end of the movable holder to connect with the first end of the cradle body and the second end of the movable holder to connect with the second end of the cradle body; and
   first and second settling units, the first settling unit positioned between the first end of the cradle body and the first end of the holder and the second settling unit positioned between the second end of the cradle body and the second end of the holder to hold and enable frictional rotation of the movable holder with respect to the cradle body to rotate the portable terminal within a predetermined angular range
   wherein each settling unit has a bracket hinge connected to one of the cradle body and the movable holder, a bracket shaft connected to the remaining of the cradle body and the movable holder and also movably connected to the bracket hinge, and a friction member, disposed between the bracket hinge and the bracket shaft, and providing a friction force to maintain a position of the movable holder after rotation thereof by a user.

5. A cradle device to support a portable terminal, comprising:
   a cradle body having first and second ends;
   a movable holder having first and second ends to support the portable terminal, the first end of the movable holder to connect with the first end of the cradle body and the second end of the movable holder to connect with the second end of the cradle body; and first and second settling units, the first settling unit positioned between the first end of the cradle body and the first end of the holder and the second settling unit positioned between the second end of the cradle body and the second end of the holder to hold and enable frictional rotation of the movable holder with respect to the cradle body to rotate the portable terminal within a predetermined angular range wherein each of the settling units comprises a bracket hinge, the bracket hinge being connected to one or the ends of the cradle body and having a respective bracket shaft threaded therein at one end and connected with one of the ends of the movable holder at another end to functionally rotate said movable holder with respect to the cradle body to maintain a position of the movable holder after rotation thereof by a user.

6. A cradle device to support a portable terminal, comprising:

a cradle body having a movable holder to support the portable terminal;

a settling unit to hold and enable frictional rotation of said movable holder with respect to said cradle body to rotate the portable terminal within a predetermined angular range, wherein said settling unit comprises a pair of bracket hinges, each bracket hinge connected to opposite sides of said cradle body and having a respective bracket shaft threaded therein at one end and connected with said movable holder at another end to frictionally rotate said movable holder with respect to said respective bracket hinge to maintain a position of the movable holder after rotation thereof by a user, wherein the bracket shafts are secured to the respective sides of the movable holder by fitting therein without any additional connection elements.

7. A cradle device to support a portable terminal, comprising:

a cradle body;

a movable holder to support the portable terminal; and a settling units, connecting the movable holder and the cradle body, and having
- a bracket hinge connected to one of the cradle body and the movable holder,
- a bracket shaft connected to the remaining of the cradle body and the movable holder, and also movably connected to the bracket hinge, and
- a friction member, disposed between the bracket hinge and the bracket shaft, and providing a friction force to maintain a position of the movable holder after rotation thereof by a user.

* * * * *